US010055001B2

(12) United States Patent
Shen et al.

(10) Patent No.: US 10,055,001 B2
(45) Date of Patent: Aug. 21, 2018

(54) SYSTEM ON CHIP POWER MANAGEMENT (71) Applicant: Seagate Technology LLC, Cupertino, CA (US)

(72) Inventors: Jin Quan Shen, Singapore (SG); Yong Peng Chng, Singapore (SG); Caihua Zheng, Singapore (SG); Choon Kiat Tan, Singapore (SG)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 315 days.

(21) Appl. No.: 14/611,648

(22) Filed: Feb. 2, 2015

(65) Prior Publication Data

US 2016/0224099 A1 Aug. 4, 2016

(51) Int. Cl.
| | | |
|---|---|---|
| G06F 12/16 | (2006.01) | |
| G06F 1/32 | (2006.01) | |
| G06F 9/4401 | (2018.01) | |
| G06F 3/0362 | (2013.01) | |
| G06F 11/07 | (2006.01) | |
| G06F 21/64 | (2013.01) | |
| G11C 11/406 | (2006.01) | |
| G06F 3/06 | (2006.01) | |

(52) U.S. Cl.
CPC .......... *G06F 1/3275* (2013.01); *G06F 1/3268* (2013.01); *G06F 1/3287* (2013.01); *G06F 12/16* (2013.01); *G06F 21/64* (2013.01); *G11C 11/40615* (2013.01); *G06F 3/0632* (2013.01); *G06F 9/4401* (2013.01); *G06F 11/0751* (2013.01); *Y02D 10/14* (2018.01); *Y02D 10/154* (2018.01); *Y02D 50/20* (2018.01)

(58) Field of Classification Search
CPC ...... G06F 12/16; G06F 1/3287; G06F 9/4401; G06F 1/3275; G06F 3/0632; G06F 11/0751; G06F 21/64; G11C 11/40615
USPC ................ 713/2, 323; 711/106; 714/52, 819
See application file for complete search history.

(56) References Cited

U.S. PATENT DOCUMENTS

| | | | | |
|---|---|---|---|---|
| 5,935,242 A | * | 8/1999 | Madany ................ | G06F 9/4411 713/1 |
| 6,449,683 B1 | * | 9/2002 | Silvester ............... | G06F 1/3203 711/103 |
| 7,117,348 B2 | * | 10/2006 | Holmberg ................ | G06F 8/65 713/1 |
| 8,766,707 B1 | * | 7/2014 | Younger ............... | G06F 1/3287 327/534 |
| 2007/0136639 A1 | * | 6/2007 | Guterman ........... | G06F 11/1068 714/763 |
| 2007/0260867 A1 | * | 11/2007 | Ethier .................... | G06F 9/4418 713/2 |
| 2014/0003145 A1 | * | 1/2014 | Akers .................... | G06F 1/3287 365/185.08 |

(Continued)

*Primary Examiner* — Ji H Bae
(74) *Attorney, Agent, or Firm* — Holzer Patel Drennan (57) ABSTRACT

An implementation of a system disclosed herein provides an apparatus, comprising a system on chip, wherein the system on chip is configured to receive a sleep command from a host and in response to the sleep command, calculate a primary checksum of a block of data from a low latency memory such as a tightly coupled memory (TCM), copy the primary checksum and the block of data into a volatile storage media, preserve interface variables of the system on chip in the volatile storage media, operate the volatile storage media in a self-refresh mode, and shut down power to other components on the system on chip.

20 Claims, 5 Drawing Sheets

(56) References Cited

U.S. PATENT DOCUMENTS

2014/0310552 A1* 10/2014 So .................. G06F 1/3275
            713/324
2015/0062743 A1* 3/2015 Horn ................ G06F 3/0647
            360/55

* cited by examiner

SYSTEM ON CHIP POWER MANAGEMENT

BACKGROUND

The present disclosure relates generally to managing power in electronic devices and more specifically, but not by limitation, to managing power in a data storage system.

An exemplary data storage system includes a device having at least one medium for data storage. The data storage system can include one or more types of storage mediums such as, but not limited, to hard discs, floppy discs, magnetic discs, optical discs, magnetic tapes, solid-state storage components, and/or combinations thereof. For instance, an exemplary data storage system can comprise a hard disc drive (HDD), a solid-state drive (SDD), a "hybrid" drive (e.g., a hybrid hard drive (HHD)), to name a few. The data storage system includes a controller that is configured to receive data and commands from a host and implement data operations to the storage media in the data storage device based on the commands.

In one example, the data storage system is powered by an exhaustible power source, such as a battery. For instance, in one particular application a data storage system is implemented in a laptop or notebook computer. In another example, a data storage system is implemented in a mobile computing device such as a personal data assistant (PDA), mobile phone, etc.

The discussion above is merely provided for general background information and is not intended to be used as an aid in determining the scope of the claimed subject matter.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Other features, details, utilities, and advantages of the claimed subject matter will be apparent from the following more particular written Detailed Description of various implementations and implementations as further illustrated in the accompanying drawings and defined in the appended claims.

An implementation of a system disclosed herein provides an apparatus, comprising a system on chip, wherein the system on chip is configured to receive a sleep command from a host and in response to the sleep command, calculate a primary checksum of a block of data from a low latency memory such as a tightly coupled memory (TCM), copy the primary checksum and the block of data into a volatile storage media, preserve interface variables of the system on chip in the volatile storage media, operate the volatile storage media in a self-refresh mode, and shut down power to other components on the system on chip.

The storage controller is further configured to receive a wakeup command from the host, verify the primary checksum stored in the volatile storage media to determine that previous command from the host is a sleep command, and select a warm boot process that restores the block of data, including executable code and data, from the volatile storage media.

These and various other features and advantages will be apparent from a reading of the following detailed description.

DETAILED DESCRIPTIONS

The present disclosure generally relates to managing power in an electronic device, and more particularly to a managing power of a storage device. While the implementations of the apparatus described herein are disclosed in the context of a storage device, the management apparatus disclosed herein may also be employed with other devices.

It can be desirable in electronic devices to achieve significant power consumption reductions by placing the devices in a reduced power mode, often referred to as the sleep mode. So-called sleep mode generally refers to a power state in which power consumption is held at a very low level, but the device is still able to decode a communicated signal to resume operation. Conceptually, sleep mode may be thought of as a power state that is just above a completely powered off state.

A challenge with implementing sleep mode schemes is the fact that many circuits leak when power is applied, particularly in complex circuits such as application specific integrated circuits (ASICs), field programmable gate arrays (FPGAs), etc. These and other types of complex circuits, all of which will generally be referred to herein as systems on a chip ("SOC"), can have millions of transistors and other active and passive elements. It can be difficult to reduce power in such devices while continuing to supply voltage due to the various opportunities for leakage paths through the circuitry.

Achieving sleep mode operation in a data storage device can be particularly difficult. Data storage devices, such as hard disc drives (HDDs) or solid-state drives (SSDs), often utilize an SOC integrated circuit that operates as a storage controller. Such controllers require power to be applied to significant portions of the circuitry even during low power modes of operation. This is because there is no capability in the SOC architecture to restore power once the SOC itself is powered off some SOC functionality is thus required to enable the system to detect a wakeup command and resume normal operation.

External control circuitry, such as an external microcontroller, can be used to reawaken the main SOC, but this type of solution generally requires additional hardware, which tends to add cost, components, complexity and space. Many current generation sleep mode designs leave the SOC energized and attempt to optimize power consumption around this paradigm.

Management of power is particularly important for solid state hybrid drives (SSHD), which combine the strength of solid state drives (SSDs) and hard disc drives (HDD) into one affordable and powerful storage device. This is due to the fact that SSHDs generally consume more power compared to SSDs. Other limitations that can be associated with current generation sleep mode designs for SOC include hardware blocks referred to as wake up power island (WUPI). Such a WUPI controls the SSHD to enter or exit device sleep modes. The WUPI is in an always-on power block that interacts with external device to manage power on the SSHD.

In one implementation, the WUPI is configured to receive a device sleep (DevSleep) command from an external device, such as a host, over a serial advanced technology attachment (ATA) interface (SATA interface) to manage the power state of the SSHD. For example, when the host asserts the DEVSLP signal to high level, the WUPI causes the SSHD to enter into the DevSleep mode. In this mode, the power for most of the SSHD hardware is shutdown, except for the WUPI block on the SOC. The WUPI block monitors for one or more types of wake up signals during the sleep mode. When the host de-assets the DEVSLP signal by pulling it to low, the WUPI closes a main switch, thus returning power to the SOC. Subsequently, the SOC operates to resume operation of the SSHD in an appropriate power mode.

In such an implementation of SSHD using a WUPI block on the SOC, the WUPI is always on with power. For example, in one implementation, the WUPI consumes approximately 20 mW in DevSleep mode, resulting in total power consumption of the DevSleep mode to be about 30 mW. This is considerably higher than the DevSleep mode power consumption in an SSD device, thus putting the SSHD device at a considerable disadvantage compared to SSD devices. Furthermore, in the configuration using WUPI block, the resume time in response to DEVSLP de-assert is similar to the resume time with normal power up.

The storage device power management apparatus disclosed herein allows reducing the power consumption and reducing the resume time compared to the SOC using WUPI block. An implementation of a system disclosed herein provides an apparatus, comprising a storage controller, wherein the storage controller is configured to receive a sleep command from a host and in response to the sleep command, calculate a primary checksum of the data from a tightly coupled memory (TCM) or calculate a primary checksum of a block of data in DRAM, copy the primary checksum and the data from the TCM into a volatile storage media, and operate the volatile storage media in a self-refresh mode and shut down power to other components.

Figure 1:
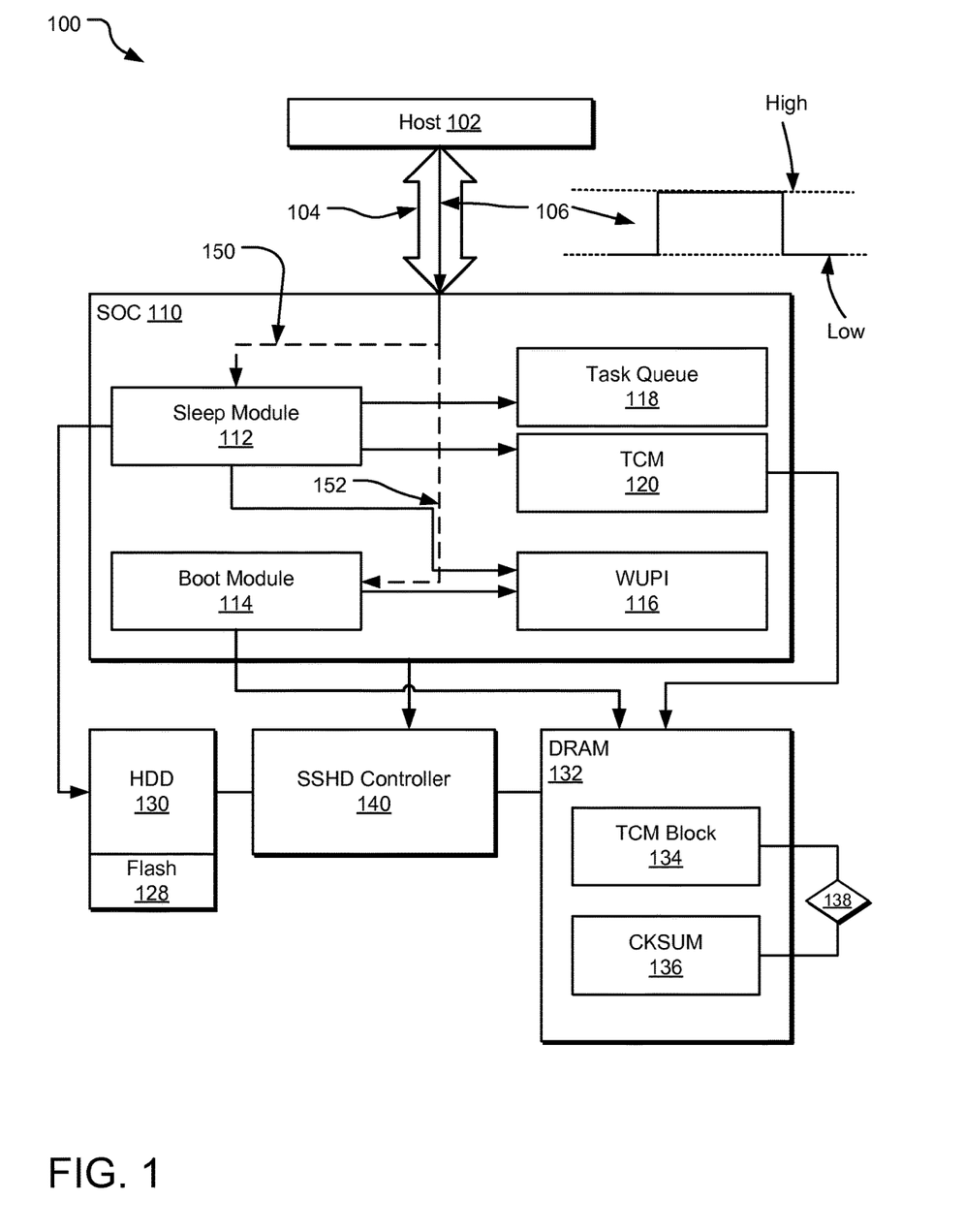
FIG. 1 illustrates a block diagram of an example storage device power management system disclosed herein.

FIG. 1 illustrates a block diagram of a storage device power management system 100 disclosed herein. The system 100 includes a system on chip (SOC) 110 working with an external device, such as a host device 102. In one implementation, the host device 102 may be a computer, a laptop, a server, etc. The SOC 110 is communicatively connected to the host 102 using an interface 104. For example, the interface 104 is a serial ATA (SATA) interface. The SATA interface is configured to communicate a power state 106 known as DevSleep to reduce power consumption in the system 100. Specifically, when the DevSleep 106 is asserted (high), it indicates that one or more components of the system 100 are to be operated in a device sleep mode. On the other hand, when the DevSleep 106 is de-asserted (low), it indicates that one or more components of the system 100 are to be operated in a regular mode.

The SOC 110 is connected to a hard disc drive (HDD) 130 and a dynamic random access (DRAM) 132. The HDD 130 may also include a flash memory 128. Together, the HDD 130 and the flash 128 may form a solid-state hard drive (SSHD). An SSHD controller 140 may be also attached to the SOC 110, wherein a controller 140 manages the operations of the SSHD. Note that while one or more of the HDD 130, the DRAM 132, the SSHD controller 140, etc., are illustrated as being connected to the SOC 110 using a communication link, in an alternate implementation, each of these components may be mounted on the SOC 110.

According to an implementation disclosed herein, the SOC 110 also includes a sleep module 112 and a boot module 114. Each of the sleep module 112 and the boot module 114 may be implemented using hardware, firmware, software, or a combination thereof. Additionally, the SOC 110 also includes a task queue, a tightly coupled memory (TCM) 120, and a wake-up power island (WUPI) 116. A task queue 118 may be configured to store a listing of one or more tasks being performed by the HDD 130. The TCM 120 may be a memory that is a system memory or I/O memory of a SSHD controller 140. Generally, TCM is a low latency memory that can be accessed by a processor at significantly fast rate and without the unpredictability related to cache memory. The TCM 120 may be used to store critical routines, such as interrupt handling routines or real-time tasks where the indeterminacy of a cache is highly undesirable as well as critical data related thereto.

The WUPI 140 is a module that controls the SSHD to enter/exit DevSleep mode. In an implementation disclosed herein, the WUPI 116 is not in an always-on mode. Specifically, upon receiving of a DevSleep 106 signal assert, the WUPI 116 is shut down. Furthermore, in response to receiving the DevSleep 106 signal assert, the DRAM 132 is kept in a self-refresh mode. The operations of the system 100 are further discussed below.

The host 102 may communicate the DevSleep 106 signal to the SOC 110 to indicate that the SSHD is to be operated in a low power mode. For example, the host may set the DevSleep 106 to high to indicate a low power mode and set the DevSleep 106 to low to indicate a normal power mode. When the host 102 asserts the DevSleep 106 high, the SOC 110 generates an interrupt signal 150. The interrupt signal 150 is sent to the sleep module 112, which services the interrupt. In an implementation, the sleep module 112 checks the task queue 118 to see if there are any existing tasks to be completed by the HDD 130. If it determines the existence of such tasks, the existing tasks are completed. After the task queue 118 is clear, the sleep module 112 parks the head of the HDD 130. The sleep module 112 also communicates with the WUPI 116 to indicate the start of the sleep mode and, in response, power to the WUPI 116 is completely turned off.

The sleep module 112 also communicates with the TCM 120 and copies the content of the TCM 120 into the DRAM 132 as a TCM block 134. Furthermore, the sleep module 112 also calculates a checksum of the content of the TCM 120 and copies the calculated checksum to the DRAM 132 as a CKSUM 136. The CKSUM 136 may be, for example, also referred to as a hash sum, is a small-size datum from a block of digital data. Typically, it may be used detecting errors that may have been introduced during transmission of data. However, the system and method disclosed herein uses the checksum to differentiate between various boot operations received by the SOC. A number of different checksum functions may be used to calculate the checksum.

After copying the TCM 120 and the CKSUM 136 in the DRAM 132, the DRAM 132 is operated in a self-refresh mode. For example, when the DRAM 132 is operated in a self-refresh mode, it may be operated at 1.8V power level. As all other components of the SSHD, including the HDD 130 and the WUPI 116, are shut down, the SSHD operates at a very low power. In one implementation, the power consumption of the SSHD is less than 10 mW. The SSHD continues to operate in the sleep mode with the low power consumption until the SOC 110 receives a low on the DevSleep 106 signal.

When the host de-asserts the DevSleep 106 signal by pulling it low, the boot module 114 initiates a warm boot of the SSHD. In response to the DevSleep 106 de-assert, a boot signal 152 is sent to the boot module 114. In response, the boot module 114 calculates a new checksum of the TCM block 134 stored in the DRAM 132 and compares 138 the new checksum with the CKSUM 136 stored in the DRAM 136. If the new checksum is same as the CKSUM 136, the boot module 114 determines the boot signal 152 to indicate a warm boot for waking the SSHD from a DevSleep mode. However, if the new checksum is not the same as the CKSUM 136, the boot module 114 determines the boot signal 152 to be a hard boot, representing a normal boot up after a power shutdown.

Upon determining the boot signal 152 to indicate a warm boot, the boot module 114 communicates with the WUPI 116 to restore the power to the WUPI 116. The WUPI 116 may communicate with other components of the SSHD, such as the HDD 130 and the flash memory 128 to cause the SSHD to exit the sleep mode. The boot module 114 also communicates with the DRAM 132 such that the DRAM 132 exits the self-refresh mode.

The creation of the sleep module 112 and the boot module 114 as discussed above allows the system 100 to shut down the WUPI 116 completely in the sleep mode. This results in significant reduction in the consumption of power during the sleep mode of the SSHD.

Figure 2:
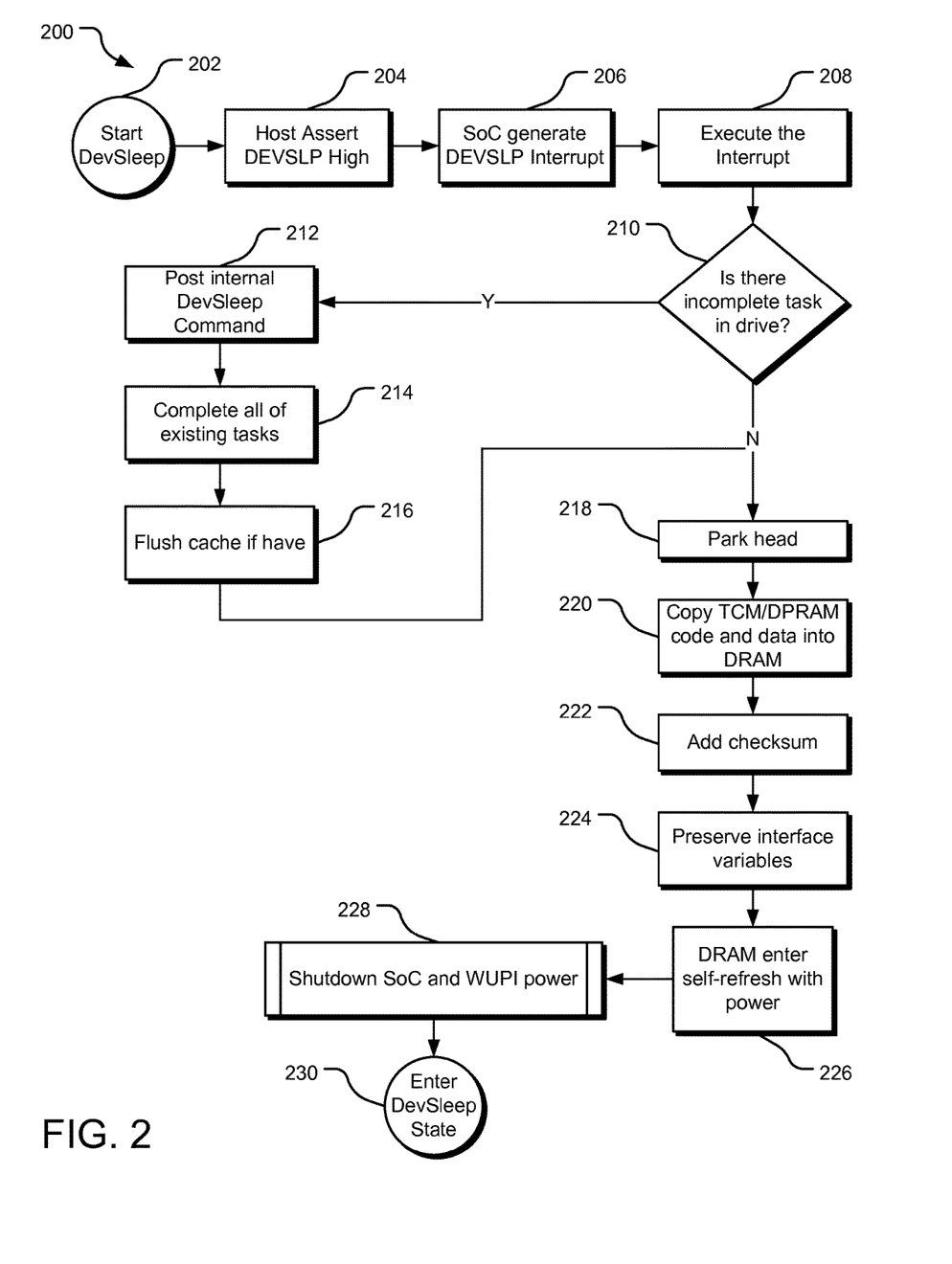
FIG. 2 illustrates example operations of the storage device power management system in response to asserting of a device sleep command.

FIG. 2 illustrates example operations 200 of the storage device power management system in response to starting 202 of a device sleep state. Specifically, a DevSleep signal is received at an operation 202. An operation 204 represents a host asserting a DevSleep signal high to an SOC. In response, the SOC generates 206 a DevSleep interrupt signal, which is communicated to a sleep module. The sleep module executes 208 the interrupt. As part of execution, an operation 210 determines if there are any incomplete tasks in a drive. If so, an operation 212 posts an internal DevSleep command, an operation 214 completes all existing tasks in the drive, and an operation 216 flushes any cache (if necessary). Subsequently, an operation 218 parks the head of the disc drive.

An operation 220 copies data and/or code from a TCM or DPRAM (dual port RAM) to DRAM. Furthermore, an operation 222 creates a checksum of the data and/or code from the TCM and saves such checksum also into the DRAM. Alternatively, the operation 222 may also create a checksum of the data and/or code from the DRAM. An operation 224 preserves one or more interface variables into the DRAM. These variables record various operation statuses for the SSHD. Subsequently, the DRAM enters a self-refresh mode with power. At operation 228, power to the SOC and the WUPI are shutdown, entering 230 the storage device into a sleep mode.

Figure 3:
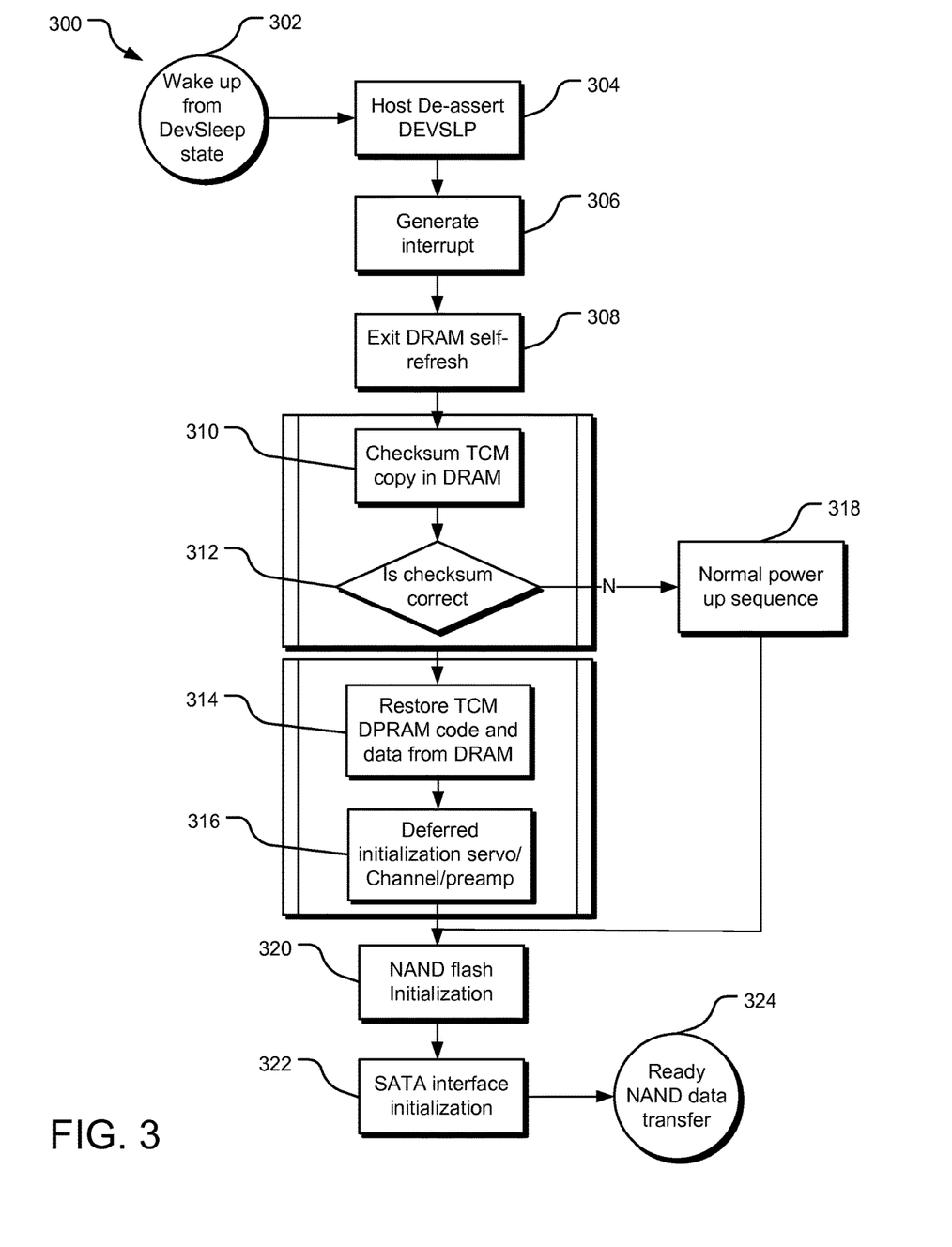
FIG. 3 illustrates example operations of the storage device power management system in response to de-asserting of a device sleep command.

FIG. 3 illustrates example operations 300 of the storage device power management system in response to wake up 302 from a device sleep state. At operation 304, a host de-asserts the DevSleep signal, for example, by pulling the DevSleep signal low. The DevSleep signal is communicated to SSHD's power switcher. In response to receiving the de-assert level of the DevSleep signal, the power switcher powers up the SOC. The SOC may include a boot module for processing the signal in response to receiving the DevSleep signal de-assert. In response to receiving the signal, an operation 308 initiates an exit of DRAM from the self-refresh mode.

Furthermore, a number of other operations to complete a warm-boot are also initiated in response to the receiving of a signal generated in response to the DevSleep signal de-assert. An operation 310 calculates a checksum of a copy of the TCM data (and/or code) stored in the DRAM. At operation 312, the newly calculated checksum of the TCM data (and/or code) stored in the DRAM is compared with the previously calculated checksum of such TCM data (and/or code), where the previously calculated checksum is stored on the DRAM.

If, based on the comparison of the newly calculated checksum and the previously calculated checksum (stored on the DRAM), the newly calculated checksum is determined not to be correct, an operation 318 determines the signal to be generated as part of a normal power up routine. However, if, based on the comparison of the newly calculated checksum and the previously calculated checksum (stored on the DRAM), the newly calculated checksum is determined to be correct, a sequence of operations for warm boot is initiated. Specifically, an operation 314 restores the TCM data and code from the DRAM to the TCM. Subsequently an operation 316 initializes SSHD media partition, but defers initialization of servo, read channel and preamp in order to quick boot up.

Finally, an operation 320 initiates NAND flash memory of the storage device and an operation 322 initiates the SATA interface to prepare it for NAND data transfer at operation 324.

Figure 4:
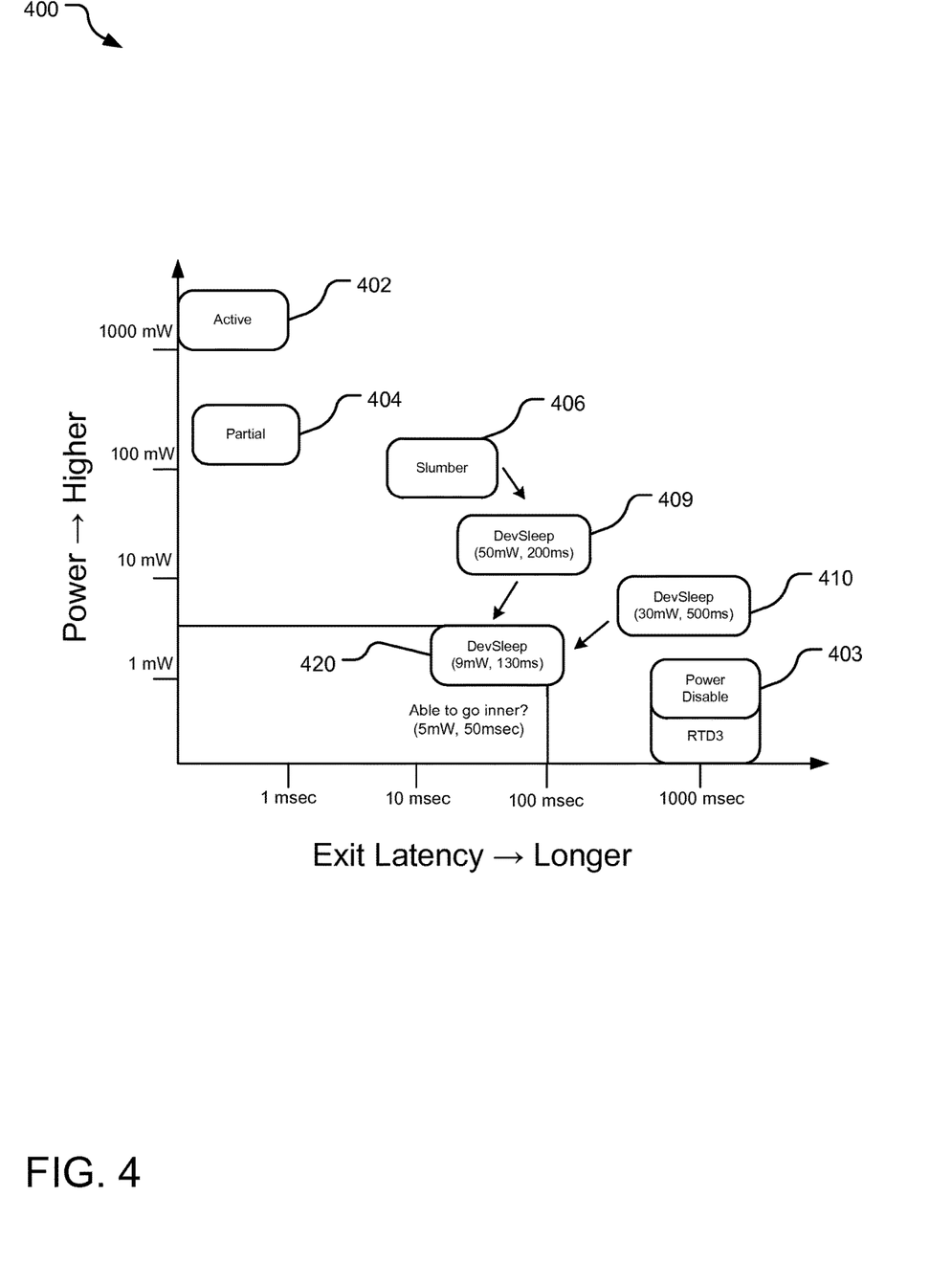
FIG. 4 illustrates example graph of the functional improvement resulting from using the storage device power management system disclosed herein.

FIG. 4 illustrates an example graph 400 illustrating the functional improvement resulting from using the storage device power management system disclosed herein. Specifically, the graph 400 illustrates the power consumption on the y-axis compared to exit latency from a give state to active state on the x-axis. As shown, when a storage device is active 402, the power consumption is high but there is no exit latency. On the other hand, when a storage device power is off, similar to a runtime D3 (RTD3) state 403, the exit latency is significantly large and the power consumption is pretty minimal.

There are a number of intermediate states where a storage device may be operated to achieve different combinations of power consumption and exit latency. It is advantageous to operate a storage device during sleep mode such that it consumes as low power as possible while still providing low exit latency. The graph 400 also illustrates a partial power state 404, and a slumber mode 406 that are used for operating various existing storage devices. Currently there exists storage devices that, in response to receiving DevSleep assert, operate storage devices approximately in the range of states 409, 410. However, the storage device power management disclosed herein allows achieving an improved combination of power consumption and exit latency, as illustrated by operating point 420, when the storage device receives a DevSleep assert. Specifically, the existing solution 409 operates the storage device with 50 mW power consumption and 200 ms exit latency and the existing solution 410 operates the storage device with 30 mW power consumption and 500 ms exit latency. Compared to that, the storage device power management system disclosed herein allows operating the storage device in response to DevSleep mode with 9 mW power and 130 ms exit latency.

Figure 5:
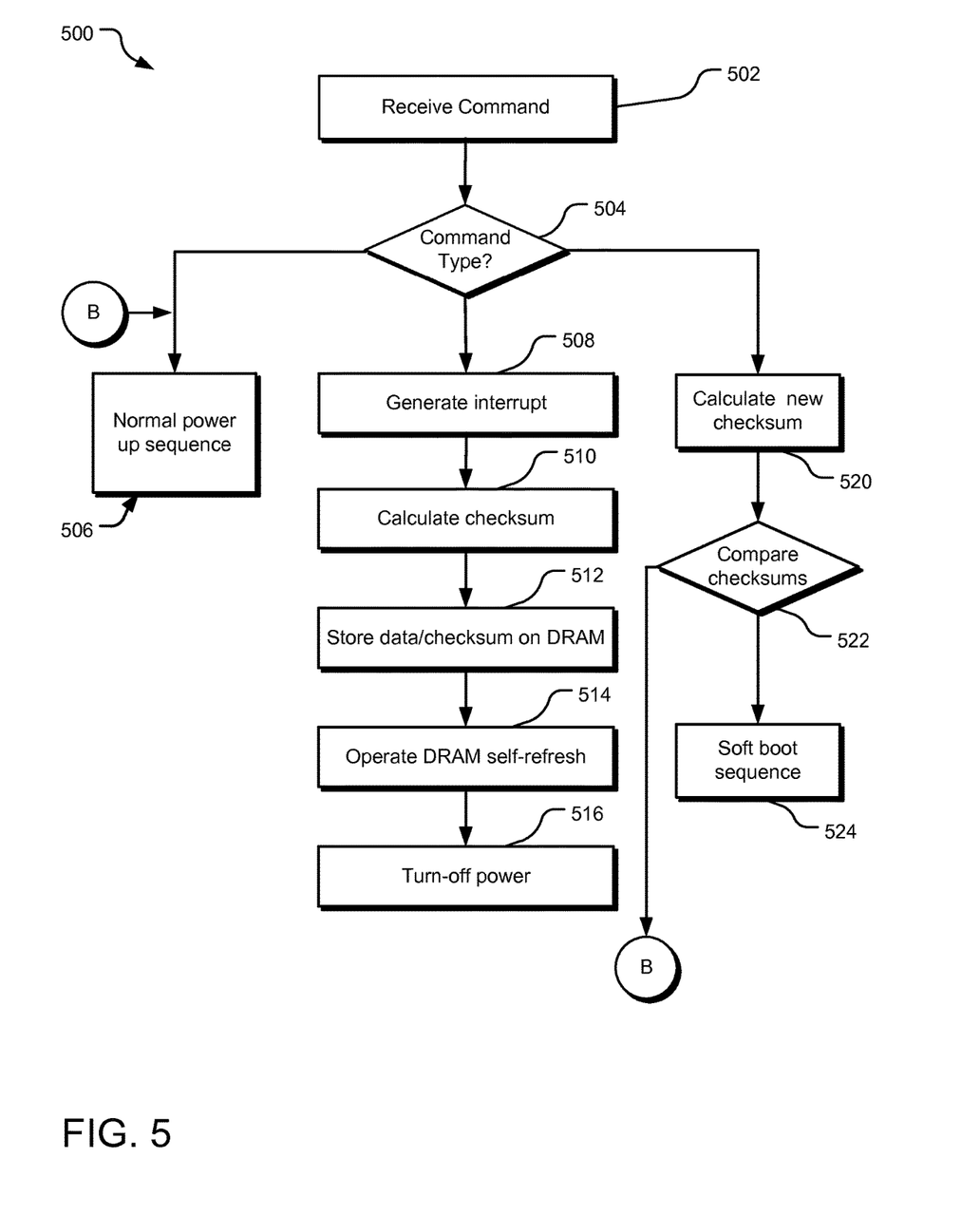
FIG. 5 illustrates example operations of a system on chip for managing device sleep state.

FIG. 5 illustrates operations 500 of a system on chip (SOC) for managing device sleep state. The operations 500 may be used for managing sleep state on any SOC with access to tightly coupled memory (TCM) and DRAM. For example, the operations 500 may be implemented on an SOC of an SSHD.

An operation 502 receives a signal relating to a sleep state of the SOC. For example, such a signal may be a DevSleep signal received from a host device attached to the SOC. A determining operation 504 determines the nature of the signal. If it is determined that the signal is a normal power on signal, normal power up processes 506 are performed.

If the determining operation 504 determines that the received signal is a DevSleep assert, indicating that the SOC needs to operate in a sleep mode, an operation 508 sends an interrupt signal to the SOC. An interrupt processing module on the SOC performs a number of operations 510-516 to process the interrupt and to put the SOC in a sleep mode. Specifically, the operation 510 may calculate a checksum of the data and/or code stored on a TCM associated with the SOC. An operation 512 stores the checksum and the data and/or code from the TCM on a DRAM. An operation 514 operates the DRAM on a self-refresh mode and an operation 516 turns-off power to all other components on the SOC.

If the determining operation 504 determines that the received signal is a DevSleep de-assert, an operation 520 calculates a new checksum based on the TCM data and/or code that is stored on DRAM. The newly calculated checksum is compared to the checksum stored on the DRAM. If a comparison operation 522 determines that the newly calculated checksum matches the checksum stored on the DRAM, an operation 524 initiates a warm boot up of the SOC from the sleep mode.

Although the block diagrams and flowcharts disclosed herein describe various embodiments in the context of storage devices for purposes of illustration and explanation, it is to be understood that the technology disclosed herein can be more broadly used for any type of devices that are subject to sudden or rude power loss.

In one implementation, the block diagrams and flowcharts disclosed above are implemented in hardware and/or in software (including firmware, resident software, microcode, etc.). Furthermore, various implementations may take the form of a computer program product on a computer-usable or computer-readable storage medium having computer-usable or computer-readable program code embodied in the medium for use by or in connection with an instruction execution system. Accordingly, as used herein, the term "circuit" may take the form of digital circuitry, such as processor circuitry (e.g., general-purpose microprocessor and/or digital signal processor) that executes program code, and/or analog circuitry.

The embodiments of the invention described herein are implemented as logical steps in one or more computer systems. The logical operations of the present invention are implemented (1) as a sequence of processor-implemented steps executing in one or more computer systems and (2) as interconnected machine or circuit modules within one or more computer systems. The implementation is a matter of choice, dependent on the performance requirements of the computer system implementing the invention. Accordingly, the logical operations making up the embodiments of the invention described herein are referred to variously as operations, steps, objects, or modules. Furthermore, it should be understood that logical operations may be performed in any order, unless explicitly claimed otherwise or if a specific order is inherently necessitated by the claim language.

The above specification, examples, and data provide a complete description of the structure and use of exemplary embodiments of the invention. Since many embodiments of the invention can be made without departing from the spirit and scope of the invention, the invention resides in the claims hereinafter appended. Furthermore, structural features of the different embodiments may be combined in yet another embodiment without departing from the recited claims.

What is claimed is:

1. A non-transitory computer-readable medium that stores executable instructions, the executable instructions, when executed by a computer, causing the computer to perform acts comprising:
   receiving a sleep command at a system on chip of a storage device and in response to the sleep command:
      determining that there are incomplete tasks in the storage device and completing the incomplete tasks in response to determining that there are incomplete tasks in the storage device before flushing a cache;
      calculating a primary checksum of a block of data from (1) a tightly coupled memory (TCM) or (2) a dynamic random access memory (DRAM),
      storing the primary checksum and the block of data into a volatile storage media,
      operating the volatile storage media in a self-refresh mode, and
      shutting down power to other components on the system on chip.

2. The non-transitory computer readable medium of claim 1, wherein the executable instructions further configured to cause the computer to preserve one or more interface variables of the storage device on the DRAM in response to the sleep command.

3. The non-transitory computer readable medium of claim 2, wherein the storage device is a solid-state hybrid drive (SSHD).

4. The non-transitory computer readable medium of claim 2, wherein the executable instructions further configured to cause the computer to post an internal device sleep command in response to determining that there are incomplete tasks in the storage device before flushing the cache.

5. The non-transitory computer readable medium of claim 2, wherein the TCM is dual port random access memory (DPRAM).

6. The non-transitory computer readable medium of claim 1, wherein the executable instructions further configured to cause the computer to receive a termination of the sleep command and in response to the termination of the sleep command:
   calculate a secondary checksum of the block data stored on the volatile storage media;
   compare the secondary checksum with the primary checksum stored on the volatile storage media; and
   if the secondary checksum matches the primary checksum, determine the termination of the sleep command to be a warm boot.

7. The non-transitory computer readable medium of claim 6, wherein the executable instructions further configured to cause the computer to determine the termination of the sleep command to be a normal power up command if the secondary checksum does not match the primary checksum.

8. A method, comprising:
   calculating, in response to receiving a sleep command at a system on chip, a primary checksum of a block of data stored on (1) a low latency memory associated with the system on chip or (2) a dynamic random access memory (DRAM) associated with the system on chip; and determining whether there are any incomplete tasks in a drive associated with the system on chip and in response to determining that there are incomplete tasks in the drive:
  posting an internal device sleep command and completing the incomplete tasks before flushing a cache;
  storing the primary checksum and the block of data on a volatile storage media,
  operating the volatile storage media in a self-refresh mode, and
  turning off power to other components of the system on chip.

9. The method of claim 8, wherein the system on chip is a system on chip of a storage device.

10. The method of claim 9, wherein the storage device is a solid-state hybrid drive (SSHD).

11. The method of claim 8, wherein the low latency memory is a tightly coupled memory (TCM) associated with the SOC.

12. The method of claim 8, wherein the sleep command is an assert on a DevSleep signal.

13. The method of claim 8, further comprising:
  preserving various SOC interface variables in the volatile storage media.

14. The method of claim 8, further comprising:
  receiving a wake up command, and in response to the wake up command:
    calculating a secondary checksum of the block of data stored on the volatile storage media;
    comparing the secondary checksum with the primary checksum from the volatile storage media; and
    if the secondary checksum matches the primary checksum, determining the wake up command to be a warm boot from a device sleep mode.

15. The method of claim 14, further comprising determining the wake up command to be a normal power up command if the secondary checksum does not match the primary checksum.

16. A method, comprising:
  receiving a device sleep command at a system on chip (SOC) connected to a disc drive; and
  determining whether there are any incomplete tasks in a volatile memory associated with the system on chip and in response to determining that there are incomplete tasks in the volatile memory:
    posting an internal device sleep command and completing the incomplete tasks before flushing a cache,
    copying TCM data and a primary checksum of the TCM data to the volatile memory, and
    turning off power to all components on the SOC except for the volatile memory.

17. The method of claim 16, further comprising:
  operating the volatile memory in a self-refresh mode.

18. The method of claim 17, wherein the SOC is an SOC for a solid-state hybrid drive.

19. The method of claim 17, further comprising preserving various SOC interface variables in the volatile memory.

20. The method of claim 17, further comprising:
  in response to receiving a wake up command at the SOC, determining a type of the wake up command based on comparison of the primary checksum stored on the volatile memory and a secondary checksum calculated from the TCM data stored on the volatile memory.

* * * * *